No. 684,841. Patented Oct. 22, 1901.
M. C. MERKER.
HEAD REST FOR DENTAL CHAIRS.
(Application filed Nov. 9, 1898.)
(No Model.)
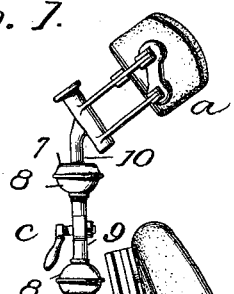
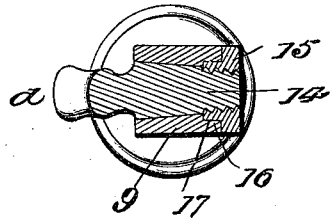
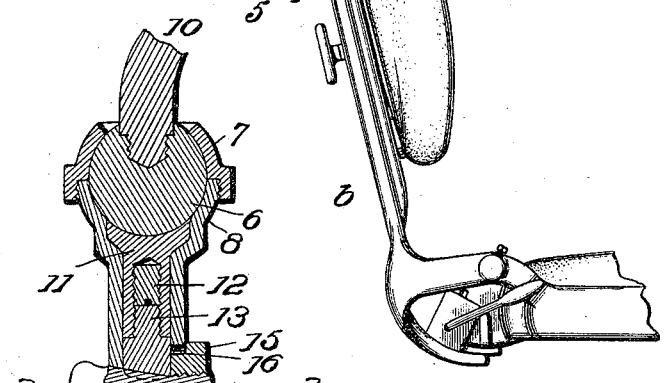
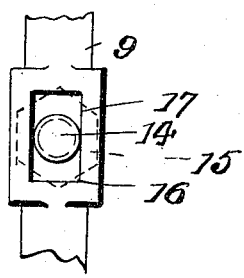
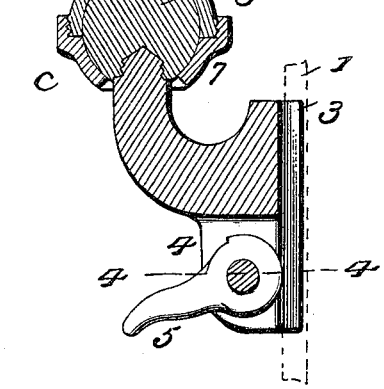
Witnesses
Inventor
M. C. Merker

UNITED STATES PATENT OFFICE.

MONT C. MERKER, OF PHILADELPHIA, PENNSYLVANIA.

HEAD-REST FOR DENTAL CHAIRS.

SPECIFICATION forming part of Letters Patent No. 684,841, dated October 22, 1901.

Application filed November 9, 1898. Serial No. 695,930. (No model.)

*To all whom it may concern:*

Be it known that I, MONT C. MERKER, a resident of Philadelphia, in the county of Philadelphia and State of Pennsylvania, have invented certain new and useful Improvements in Dental Chairs; and I do hereby declare the following to be a full, clear, and exact description of the invention, such as will enable others skilled in the art to which it pertains to make and use the same.

The invention relates to head-rests, and has for its object to improve the mechanism for locking the adjustable connections constituting a part of a head-rest support.

The invention consists in the construction herein described and pointed out.

In the accompanying drawings, Figure 1 is a side elevation of a head-rest, head-rest support, and a part of a chair-back. Fig. 2 is an enlarged longitudinal section of the locking device. Fig. 3 is a section on line 3 3 of Fig. 2. Fig. 4 is a section on line 4 4 of Fig. 2. Fig. 5 is a partial front elevation of a head-rest support.

The letter *a* denotes a head-rest. *b* indicates the upper part of a chair-back frame, *c* a head-rest support, and *d* a lever for locking the support to the back.

The head-rest support is connected to a back-frame extension 1, provided with an undercut rib 2, which is loosely embraced by the lips 3 of a suitably-formed part of a bracket 4, connected to said head-rest support. A lever 5, fulcrumed in the forked part of the bracket, has an eccentrically-formed end adapted when suitably turned to draw together the overlapping lips of the bracket and frame-extension rib, with the effect to lock them in any desired position. The bracket at its upper end supports a ball 6, embraced by a socket, which comprises a cup 7, screwed onto the cup-shaped end 8 of a tube 9. Said tube has a like cup-shaped part 8 at its upper end, joined in like manner to a cup-like part 7 to form a socket for a ball 6, which supports the head-rest by a stem 10. Within the cup-like ends 8 of tube 9 and fitted to the respective balls are movable blocks 11, having tubular stems partly filled with adjustable screw-plugs 12. In the ends of said stems are secured adjustable screw-threaded posts 13, which are made concave to fit a transverse plug 14, as indicated by dotted lines in Fig. 2. The part of the plug contiguous the screw-threaded posts 13 is made frusto-conical to crowd said screw-threaded posts when the said frusto-conical part is forced between them. Said plug 14 is provided with a handle on one end, and on the other it is screw-threaded to receive a nut 15, having its outer part made larger than the opening 16 in tube 9, whereby it bears on the exterior of the tube. It also has a part 17 laterally fitting the said opening to prevent the turning of the nut, whereby when the plug is appropriately screwed it is forced through the tube and nut, with the effect to crowd apart the screw-threaded posts 13 and blocks 11, which at such time bind the balls immovably in their sockets. The balls are loosened by a reverse movement of the handled plug 14. The two universal joints, comprising the two balls and the intermediate tube, provide for a wide range of adjustment required in a chair designed for the use both of children and adults. The simultaneous locking of the joints by the manipulation of the handle, situated between them at a point conveniently grasped for the manipulation of the head-rest support, is advantageous.

Having thus described my invention, what I claim as new, and desire to secure by Letters Patent, is—

1. In a dental chair, a support intermediate the head-rest and back-frame comprising the tube having a ball-and-socket joint at each end and a device adapted to simultaneously lock both parts, and means for separately adjusting the pressure of each of the duplex locking parts.

2. In a dental chair, a support intermediate the head-rest and back-frame comprising the tube having a ball-and-socket joint at each end and a device adapted to simultaneously lock both parts, and means for separately adjusting the pressure of each of the duplex locking parts, said means comprising blocks with tubular sleeves and screws adjustable in the sleeves.

3. In a dental chair, a support intermediate the head-rest and back-frame comprising the tube having a ball-and-socket joint at each end and a device adapted to simultaneously lock both parts, said device comprising a rotary member situated between the joints and transversely of the tube, and posts movable within and lengthwise the tube operatively connected with the said rotary member.

4. In a dental chair, a support intermediate the head-rest and back-frame comprising the tube having a ball-and-socket joint at each end and a device adapted to simultaneously lock both parts, said device comprising a rotary member situated between the joints and transversely of the tube, posts movable within and lengthwise the tube operatively connected with the said rotary member, and a non-rotatable nut screwing on said rotary member.

5. In a dental chair, a support intermediate the head-rest and back-frame comprising the tube having a ball-and-socket joint at each end and a device adapted to simultaneously lock both parts, said device comprising a rotary member situated between the joints and transversely of the tube, posts movable within and lengthwise the tube operatively connected with the said rotary member, a non-rotatable nut, and movable blocks in the tube, said tube being slotted to receive a part of the nut.

6. In a dental chair, a support intermediate the head-rest and back-frame comprising the tube having a ball-and-socket joint at each end and a device adapted to simultaneously lock both parts, said device comprising a rotary member of frusto-conical form situated transversely of the tube, and a non-rotatable nut screwing on said rotary member.

In testimony whereof I have signed this specification in the presence of two subscribing witnesses.

MONT C. MERKER.

Witnesses:
SAMUEL LIPSCHUTZ,
FRANCIS C. ELY.